(12) United States Patent
Robinson

(10) Patent No.: US 12,527,307 B1
(45) Date of Patent: *Jan. 20, 2026

(54) FISHING HOOK WITH GROOVE TO RECEIVE REMOVABLE BARB

(71) Applicant: Marion Johnathan Robinson, Tremont, MS (US)

(72) Inventor: Marion Johnathan Robinson, Tremont, MS (US)

(*) Notice: Subject to any disclaimer, the term of this patent is extended or adjusted under 35 U.S.C. 154(b) by 160 days.

This patent is subject to a terminal disclaimer.

(21) Appl. No.: 18/216,627

(22) Filed: Jun. 30, 2023

Related U.S. Application Data

(63) Continuation-in-part of application No. 17/019,193, filed on Sep. 11, 2020, now Pat. No. 11,819,011.

(60) Provisional application No. 63/358,111, filed on Jul. 2, 2022, provisional application No. 62/898,662, filed on Sep. 11, 2019.

(51) Int. Cl.
   *A01K 83/02* (2006.01)

(52) U.S. Cl.
   CPC .................... *A01K 83/02* (2013.01)

(58) Field of Classification Search
   CPC ............................... A01K 83/00; A01K 83/02
   USPC .......................................... 43/34, 35, 36, 37
   See application file for complete search history.

(56) References Cited

U.S. PATENT DOCUMENTS

| | | | | | |
|---|---|---|---|---|---|
| 2,118,147 | A | * | 5/1938 | Blodgett | A01K 97/14 |
| 2,979,848 | A | * | 4/1961 | McConnell | A01K 83/00 |
| 5,010,679 | A | * | 4/1991 | Tischer | A01K 85/00 |
| | | | | | 43/42.04 |
| 2002/0124456 | A1 | * | 9/2002 | Mendoza | A01K 83/06 |
| | | | | | 43/44.2 |
| 2014/0283433 | A1 | * | 9/2014 | Gafford | A01K 83/02 |

* cited by examiner

*Primary Examiner* — Joshua J Michener
*Assistant Examiner* — Henry Hooper Mudd
(74) *Attorney, Agent, or Firm* — Jeremy Clay

(57) ABSTRACT

A fishing hook apparatus having one or more removable barbs that may be initially hidden in the body of the hook and which may become extended outwardly from the hook after a fish is caught on the hook. The extendable barbs are configured so they are forcibly urged from a first barb position proximate the hook to a second barb position in which the barb extends outwardly from the hook. The extendable barb has first and second barb ends and is disposed for angular movement with respect to the hook from the extendable barb first end, and the second barb end moves along an arcuate path from the first barb position to the second barb position. A band may be included, circumferentially encircling the hook, slidably movable from first to second band positions. When in the first band position, each barb is held in a slot by the band. When in the second band position, the barb moves into its second position and extends outwardly from the hook.

9 Claims, 4 Drawing Sheets

FISHING HOOK WITH GROOVE TO RECEIVE REMOVABLE BARB

PRIORITY

This application claims the Jul. 2, 2022 priority date of U.S. Provisional Patent Application Ser. No. 63/358,111. The entirety of that provisional application is incorporated herein by reference.

FIELD OF THE DISCLOSURE

The present invention relates to hooks for catching fish and a fishhook having a removeable barb.

BACKGROUND OF THE INVENTION

Over 40 million people in the United States fish for sport, a number greater than greater than all of the country's golf and tennis players combined. Fishing tournaments create substantial economic opportunity for local communities and the sport fishing industry. In most mainstream fishing competitions, releasing the fish relatively unharmed after catch is a large part of the game. Competitive fishing has evolved to incorporate practices more compatible with sustaining fish stocks. These changes have alleviated much of the concern about the potential negative effects of fishing tournaments on fish stocks.

Fishing laws are meant to protect fish and make sure that there is fishing to be shared and enjoyed by everyone. Fisheries biologists study bodies of water to check on fish numbers and the health of fish populations. If there is a problem with a fish stock, regulations are created to help keep the fish population healthy. There are several types of fishing regulations, and they vary from one state to another. In some places, only a single barbless hook may be used at certain times during the year. In this context, "barbless" means that the hook either does not have a barb or that the barb is bent down, such that the barb is hidden. An advantage of barbless hooks is reduced injuries to fish when the hooks are removed. However, there are also disadvantages. Prior art barbless fishing hooks often do not allow for a secure hooking of the fish, and they often release the fish from the hook as the fish wiggles and fights. Sports fish, such as largemouth bass, are known for jumping out of the water to try to throw or spit the hook from their mouth. It is therefore desirable to have an improved fishing hook, initially seeming to be barbed, having a removable barb that can be removed from the hook when an angler desires to unhook a fish.

SUMMARY OF THE INVENTION

The present invention is a fishing hook apparatus having a removable barb that may be initially hidden in the body of the hook and which may become extended outwardly from the hook only after a fish is caught on the hook. The fishing apparatus includes a shank, a hook extending from a distal portion of the shank, and one or more extendable barbs. The extendable barbs are configured so they are forcibly urged from a first barb position proximate the hook to a second barb position in which the barb extends outwardly from the hook. The extendable barb has first and second barb ends, and is disposed for angular movement with respect to the hook from the extendable barb first end, and the second barb end moves along an arcuate path from the first barb position to the second barb position. A band may be included, circumferentially encircling the hook, slidably movable from first to second band positions. When in the first band position, each barb is held in a slot by the band. When in the second band position, the barb moves into its second position and extends outwardly from the hook. Fixed non-movable barbs may also be provided on the hook.

It is an object of the present invention to provide a fishing hook apparatus that has one or more movable barbs initially hidden within the body of the hook, such that, after a fish has been hooked, the movable barb or barbs then extend outwardly from the hook, thereby creating a "barbed" configuration of the hook, with the extension of the movable barb or barbs only happening after the hook has passed through a lip of a fish, so as to provide a more secure and better hooking of the fish than heretofore possible with a barbless hook.

It is an object of the present invention to allow a fishing user to abide by fishing regulations that restrict use of an open barb by providing a barb that is initially hidden within the hook until the hook has passed through a lip of a fish. It is a further object of the present invention to provide a fishing hook that will provide less harm to fish than the injury suffered by hooking with a regular "open barb" curved-end hook. It is a still further object of the present invention to provide a fishing hook that pass through the lip of a fish and then lock the fish onto the hook, but that will not create another injury to the fish when removing the hook and barb from the fish, unlike prior art open barbs.

It is an object of the present invention to provide a fishing hook and barb that can enter through and be removed from the fish's lip along the same path, thereby causing minimal injuries to the fish.

It is a further object of the present invention to provide a securing mechanism that securely holds the movable barb hidden within the hook until after the hook has passed through the lip of the fish.

It is a still further object of the present invention to provide a movable barb hook that can also have fixed, non-movable, barbs, such that fish can be retained more securely on hooks having fixed barbs, thereby preventing the fish from escaping from the hook once caught.

The fishhook of the present invention is applicable to sports fishing for species such as largemouth bass, which are often caught in fishing tournaments and released. The invention causes less harm than prior art fishhooks, increasing the survival rate of released fish. In addition to bass fishing, the fishhook of the present invention is well suited for use in sport fishing for other fish species such as marlin, swordfish, tuna, trout, crappie, panfish, etc.

BRIEF DESCRIPTION OF THE SEVERAL VIEWS OF THE DRAWINGS

FIG. 3 shows the hook being used to catch a fish.

FIG. 4 shows the hook being used to catch a fish.

DETAILED DESCRIPTION

Figure 1:
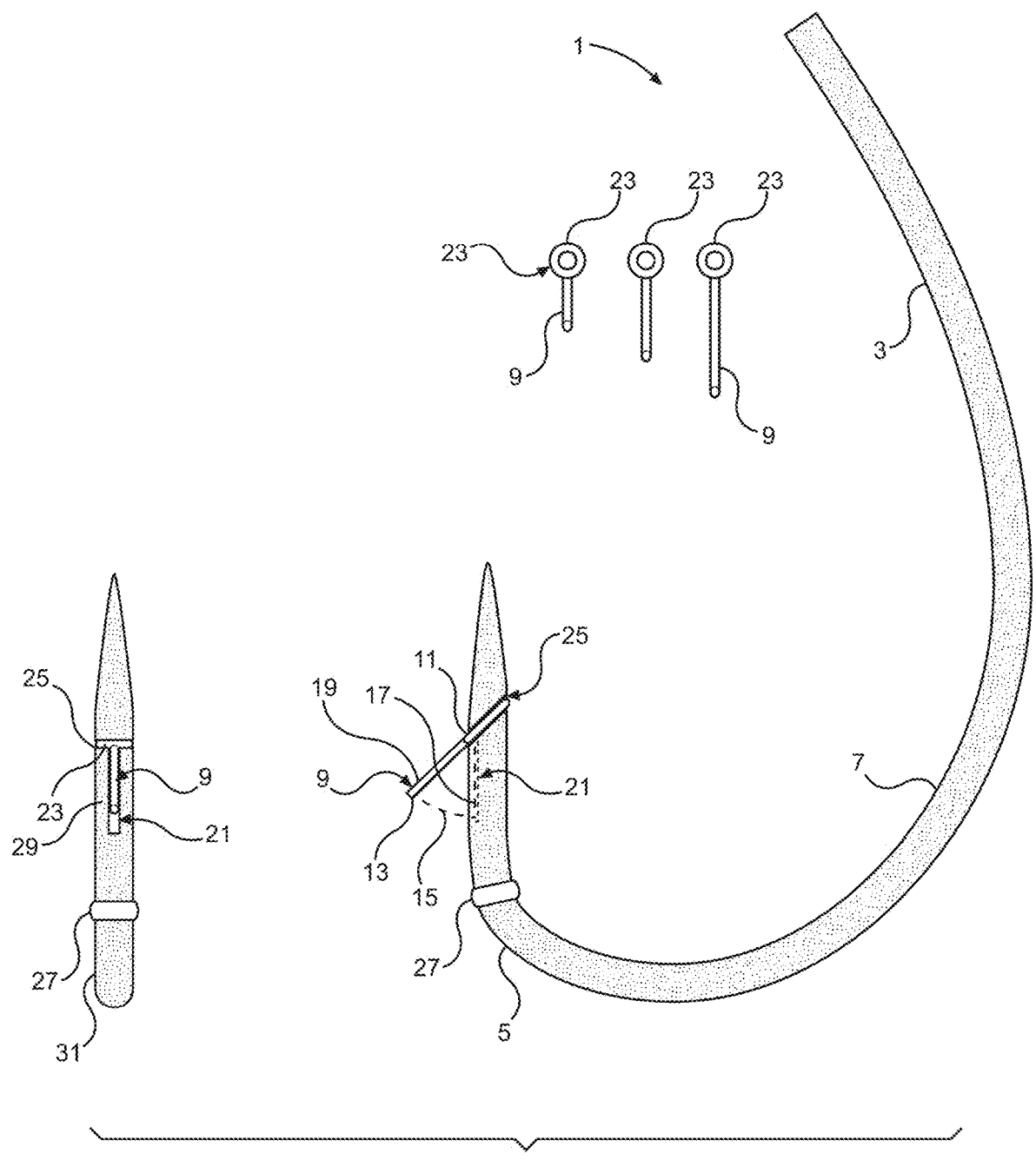
FIG. 1 is a partial sectional view of one embodiment of the present invention, with a removeable barb affixed to a stretchable band.

FIG. 1 is a partial sectional view of one embodiment of the fishhook with groove to receive removeable barb 1. The fishhook 1 is seen to have a shank 3, a hook 5 extending from a distal portion 7 of shank 3, and a selectively extendable barb 9 having a first end 11 and a second end 13. Barb 9 is disposed for angular movement with respect to hook 5 from said first end 11 of said barb, with second end 13 being movable along an arcuate path 15 (shown in dotted outline in FIG. 1) from a first barb position 17, in which second end 13 is proximate to hook 5, to a second barb position 19 in which second end 13 extends outwardly from hook 5. When the barb 9 is in its first position 17, the barb 9 may reside completely within a groove 21 running lengthwise down the hook 5 that is adapted to receive the barb 9.

In the embodiment depicted in FIG. 1, the first end 11 of the barb 9 is affixed to an elastic band 23. The band 23 resides in a circumferential groove 25 that is adjacent to the lengthwise groove 21. The band 23 may be comprised of rubber, silicone rubber, or other similar flexible material. The barb 9 may be made of stainless steel or other appropriate material that is flexible enough allow the barb 9 to flexibly move from its first position 17 to its second position 19.

The first embodiment of the fishhook 1 further includes a band 27 circumferentially encircling hook 5 and slidably movable along hook 5 between a first band position 29, in which band 27 holds barb 9 in first barb position 17 and a second band position 31 in which band 27 does not hold barb 9 in first barb position 17, thereby freeing barb 9 to move from first barb position 17 to second barb position 19. The band 27 may be comprised of rubber, silicone rubber, or other similar flexible material. The fishhook 1 is preferably made of metal with a corrosion-resistant coating.

To assemble the barb 9 onto the fishhook 1, the user first slides the band 27 onto the fishhook 1 and into the second band position 31. Next, the angler slides the barb 9 band 23 onto the fishhook 1 and into the circumferential groove 25. When assembled in this fashion, the circumferential groove 25 receives the barb 9 band 23, and the barb 9 is affixed to the hook 5 in the second barb position 19. The user then presses the barb 9 into the first barb position 17 so the barb is received within the lengthwise groove 21. The band 27 is moved into the first band position 29, retaining the barb 9 in the first barb position 17. This process may be reversed to remove the barb 9 from the fishhook 1.

Figure 2:
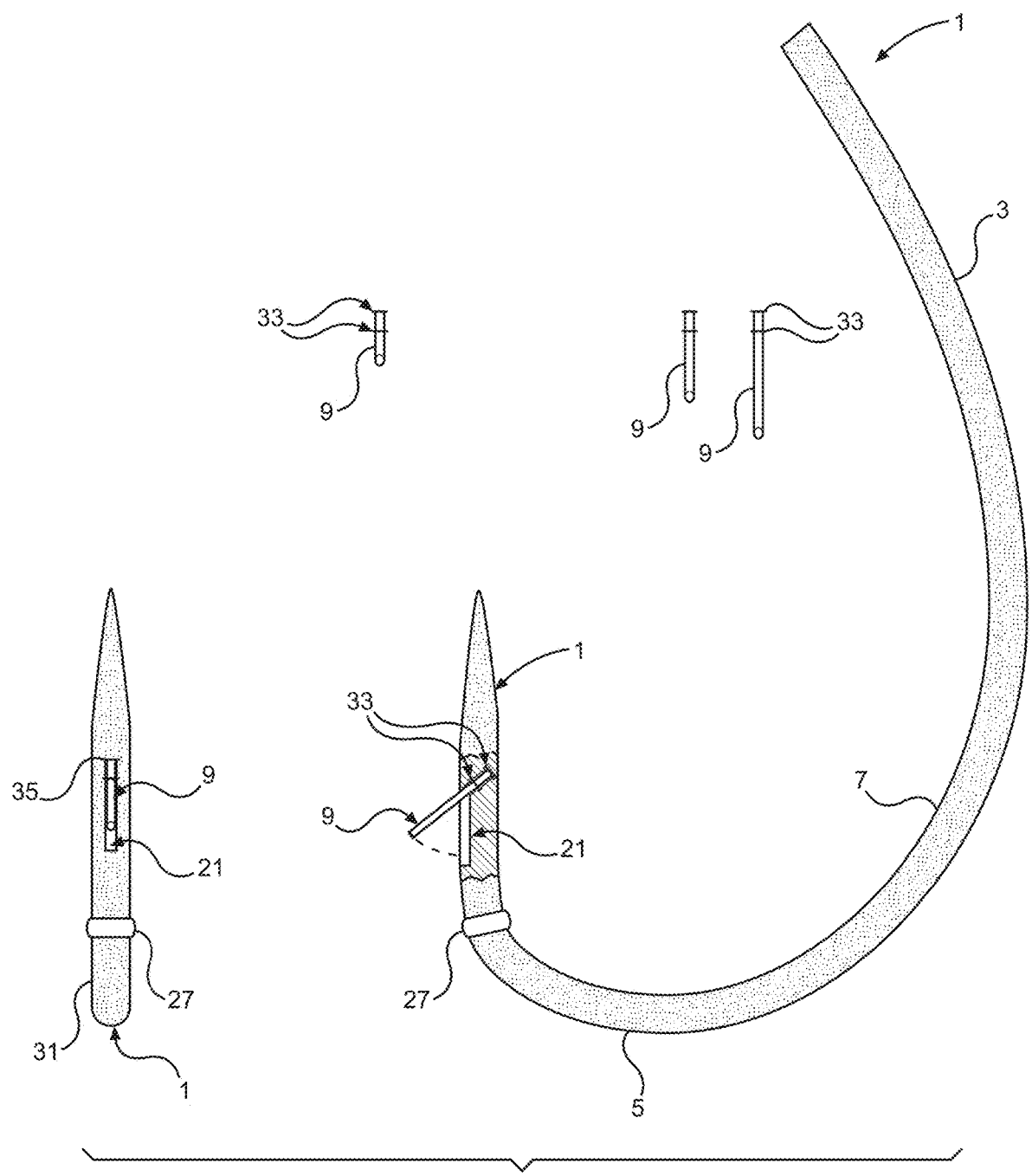
FIG. 2 is a partial sectional view of a second embodiment of the present invention, with a removable barb that incorporates stops to engage with a groove.

FIG. 2 is a partial sectional view of a second embodiment of the present invention, with a removable barb 9 that incorporates stops 33 to engage with a groove 21. The groove 21 may incorporate notches 35 that are adapted to receive the stops 33 on the removeable barb 9. The groove 21 may pass completely through the hook 5, or the groove 21 may be configured so that it does not pass completely through the hook 5. To assemble the barb 9 onto the fishhook 1, the user first slides the band 27 onto the fishhook 1 and into the second band position 31. Next, the angler places the barb 9 into the groove 21 and aligns the stops 33 on the barb 9 with the notches 35 in the groove 21. When assembled in this fashion, the groove 21 receives the barb 9 and the groove 21 notches 35 receive the barb 9 stops 33, and the barb 9 is affixed to the hook 5 in the second barb position 19. The user then presses the barb 9 into the first barb position 17 so the barb is received within the lengthwise groove 21. The band 27 is moved into the first band position 29, retaining the barb 9 in the first barb position 17. This process may be reversed to remove the barb 9 from the fishhook 1.

Figure 3A:
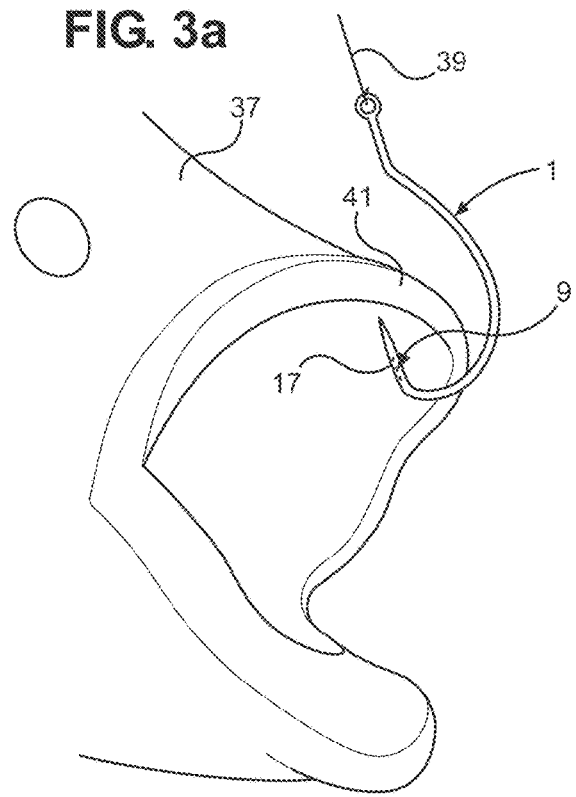
FIG. 3a depicts the hook before it penetrates the lip of a fish.
Figure 3B:
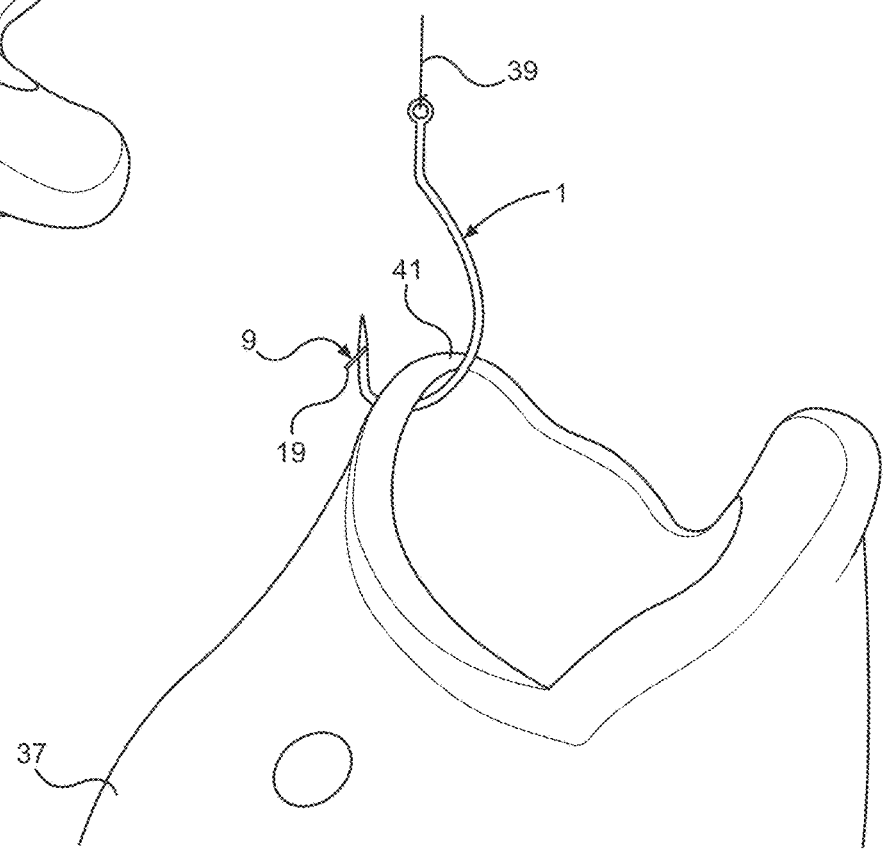
FIG. 3b depicts the hook after it penetrates the lip of a fish.

FIG. 3 shows the fishhook 1 being used to catch a fish 37. A fishing line 39 is attached to the hook 1 in the usual well-known manner. As shown in FIG. 3*a*, before the hook 1 penetrates the lip 41 of the fish 37, the barb 9 is in the first barb position 17 and is "hidden," residing completely within the groove 21 running lengthwise down the hook 5. As shown in FIG. 3*b*, after the hook 1 passes through the lip 39 of the fish 37, the barb 9 flexibly moves from its first position 17 to its second position 19, entrapping the fish 37 on the hook 1.

Figure 4A:
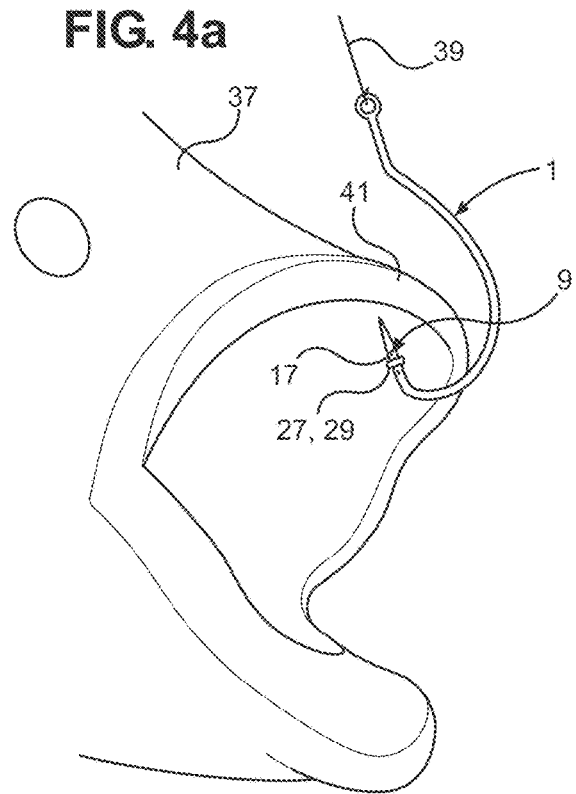
FIG. 4a depicts the hook before it penetrates the lip of a fish.
Figure 4B:
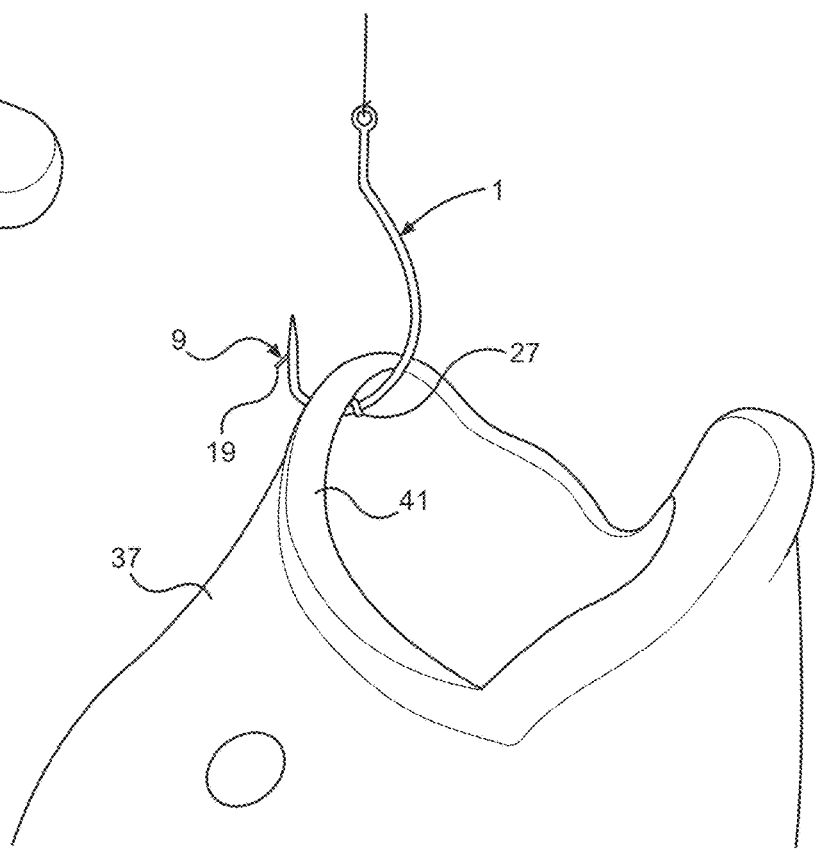
FIG. 4b depicts the hook after it penetrates the lip of a fish.

FIG. 4 shows the fishhook 1 being used to catch a fish 37. A fishing line 39 is attached to the hook 1 in the usual well-known manner. As shown in FIG. 4*a*, before the hook 1 penetrates the lip 41 of the fish 37, the barb 9 is in the first barb position 17 and is "hidden," residing completely within the groove 21 running lengthwise down the hook 5. The barb 9 is held in its first position 17 by the band 27. In FIG. 4*a*, the band 27 is in the first band position 29, retaining the barb 9 in the first barb position 17. As shown in FIG. 4*b*, after the hook 1 passes through the lip 41 of the fish 37, the band 27 is slidably moved along the hook 1 as the hook 1 passes through the lip 41 of the fish 37. As the band 27 moves from the first band position 29 to the second band position 31, the barb 9 moves from the first barb position 17 to the second barb position 19, entrapping the fish 37 on the hook 1.

After the fish 37 is caught, a user may completely remove the barb 9 from the hook 1 to allow the hook 1 to reversibly pass through the lip 41 of the fish 37 without causing injury to the fish 37. Alternatively, a user may press the barb 9 down from the second barb position 19 to the first barb position 17 and hold the barb 9 in its first position 17 as the hook 1 is reversibly passed through the lip 41 of the fish, allowing the fish 37 to be released without injury.

The foregoing description of preferred embodiments for the fish hook with groove for receiving a removable barb 1 is presented for the purposes of illustration and description. They are not intended to be exhaustive or to limit the invention to the precise form disclosed. Obvious modifications or variations are possible in light of the above teachings. The embodiments are chosen and described in an effort to provide the best illustration of the principles of the invention and its practical applications, and to thereby enable one of ordinary skill in the art to utilize the invention in various embodiments and with various modifications as are suited to the particular use contemplated.

The invention claimed is:

1. A fishhook comprising:
a shank;
a hook extending from a distal portion of the shank;
a removeable, selectively extendable barb having a first end and a second end, said barb being disposed for angular movement with respect to said hook, with the second end of the barb being moveable along an arcuate path from a first barb position in which the barb is proximate to the hook and a second barb position in which the second end of the barb extends outwardly from the hook;
and a groove running lengthwise down the hook that is adapted to receive the barb so that the barb is capable of residing completely within the groove without protruding above the groove.

2. The fishhook of claim 1, where the first end of the barb is affixed to an elastic band.

3. A fishhook comprising:
a shank;
a hook extending from a distal portion of the shank;
a removeable, selectively extendable barb having a first end and a second end, said barb being disposed for angular movement with respect to said hook, with the second end of the barb being moveable along an arcuate path from a first barb position in which the barb is proximate to the hook and a second barb position in which the second end of the barb extends outwardly from the hook; and a circumferential groove adapted to receive an elastic band, thereby attaching a removable barb to the fishhook.

4. The fishhook of claim 3, where the first end of the barb is affixed to an elastic band.

5. The fishhook of claim 1, further comprising a band circumferentially encircling the hook that is slightly moveable from a first band position to a second position.

6. A fishhook comprising:

a shank;

a hook extending from a distal portion of the shank; and a removeable, selectively extendable barb having a first end and a second end, said barb being disposed for angular movement with respect to said hook, with the second end of the barb being moveable along an arcuate path from a first barb position in which the barb is proximate to the hook and a second barb position in which the second end of the barb extends outwardly from the hook, where the removable barb incorporates stops; and a groove running lengthwise down the hook that is adapted to receive the barb, where the lengthwise groove incorporates notches adapted to receive the stops of the removeable barb so that the stops of the removable barb are engaged with the notches and held in a fixed position.

7. The fishhook of claim 1, further comprising fixed non-movable barbs on the hook.

8. The fishhook of claim 3, further comprising a band circumferentially encircling the hook that is slidably moveable from a first band position to a second band position.

9. The fishhook of claim 3, further comprising fixed non-movable barbs on the hook.

* * * * *